(12) United States Patent
Feder et al.

(10) Patent No.: US 9,560,554 B2
(45) Date of Patent: *Jan. 31, 2017

(54) SELECTING A COMMAND NODE IN A HETEROGENEOUS COMMUNICATION SYSTEM

(71) Applicant: Lucent Technologies, Inc., Murray Hill, NJ (US)

(72) Inventors: Peretz Moshes Feder, Englewood, NJ (US); Ajay Rajkumar, Morristown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 91 days.

This patent is subject to a terminal disclaimer.

(21) Appl. No.: 14/588,688

(22) Filed: Jan. 2, 2015

(65) Prior Publication Data
US 2015/0117413 A1 Apr. 30, 2015

Related U.S. Application Data

(63) Continuation of application No. 11/433,835, filed on May 12, 2006, now Pat. No. 8,965,371.

(51) Int. Cl.
| | | |
|---|---|---|
| *H04W 36/00* | (2009.01) | |
| *H04L 12/54* | (2013.01) | |
| *H04W 48/20* | (2009.01) | |
| *H04W 36/18* | (2009.01) | |
| *H04W 4/00* | (2009.01) | |

(52) U.S. Cl.
CPC ...... *H04W 36/0022* (2013.01); *H04L 12/5692* (2013.01); *H04W 36/18* (2013.01); *H04W 48/20* (2013.01); *H04W 4/00* (2013.01)

(58) Field of Classification Search
CPC .............. H04W 36/005; H04W 88/06; H04W 36/0011; H04W 76/02; H04W 80/04; H04W 84/12; H04W 36/08; H04W 36/18; H04W 36/0022; H04W 36/14; H04W 92/02; H04L 1/0025; H04L 63/164; H04L 69/329
See application file for complete search history.

(56) References Cited

U.S. PATENT DOCUMENTS

| | | | | |
|---|---|---|---|---|
| 6,603,971 B1 * | 8/2003 | Mohebbi | ................ | H04B 7/022 370/331 |
| 7,536,184 B2 * | 5/2009 | Poczo | ..................... | H04W 8/18 455/432.3 |
| 8,965,371 B2 * | 2/2015 | Feder | .................. | H04L 12/5692 370/331 |

(Continued)

FOREIGN PATENT DOCUMENTS

WO 03079700 A1 9/2003

OTHER PUBLICATIONS

"IEEE 802.21 Media Independent Handover Services," Joint Harmonized Contribution (May 2005).

*Primary Examiner* — Matthew Sams
(74) *Attorney, Agent, or Firm* — Davidson Sheehan LLP

(57) ABSTRACT

The present invention provides a method involving at least one mobile node and a heterogeneous network comprising a plurality of access nodes. One embodiment of the method includes providing at least one first message including information indicative of a selected access node. The access node is selected to provide command services to the at least one mobile node.

21 Claims, 4 Drawing Sheets

(56) References Cited

U.S. PATENT DOCUMENTS

| | | | |
|---|---|---|---|
| 2003/0179731 A1 | 9/2003 | Noguchi et al. | |
| 2005/0048975 A1 | 3/2005 | Ranta Aho et al. | |
| 2005/0249161 A1 | 11/2005 | Carlton | |
| 2006/0140150 A1* | 6/2006 | Olvera-Hernandez | H04W 36/005 370/331 |
| 2006/0159047 A1* | 7/2006 | Olvera-Hernandez | H04W 36/005 370/331 |
| 2006/0229075 A1* | 10/2006 | Kim | H04W 36/005 455/436 |
| 2006/0230151 A1* | 10/2006 | Kim | H04W 36/005 709/226 |
| 2006/0246904 A1* | 11/2006 | Olvera-Hernandez | H04W 36/38 455/438 |
| 2006/0258355 A1* | 11/2006 | Olvera-Hernandez | H04W 36/005 455/436 |
| 2006/0268782 A1* | 11/2006 | Kwak | H04L 61/2015 370/331 |
| 2006/0274697 A1* | 12/2006 | Kim | H04W 36/005 370/331 |
| 2006/0276192 A1* | 12/2006 | Dutta | H04W 36/005 455/436 |
| 2006/0286997 A1* | 12/2006 | Seki | H04B 7/022 455/525 |
| 2007/0264995 A1* | 11/2007 | Feder | H04L 12/5692 455/426.1 |
| 2009/0238139 A1* | 9/2009 | Kim | H04W 36/005 370/331 |

* cited by examiner

SELECTING A COMMAND NODE IN A HETEROGENEOUS COMMUNICATION SYSTEM

CROSS REFERENCE TO RELATED APPLICATIONS

This application is a continuation of U.S. patent application Ser. No. 11/433,835, filed on May 12, 2006, which is incorporated by reference herein in its entirety.

BACKGROUND OF THE INVENTION

1. Field of the Invention

This invention relates generally to communication systems, and, more particularly, to heterogeneous communication systems.

2. Description of the Related Art

A conventional communication system uses one or more access nodes to provide network connectivity to one or more mobile nodes. For example, in a cellular communication system that operates according to Universal Mobile Telecommunication Services (UMTS) standards, one or more nodes may be used to provide wireless network connectivity to mobile nodes. The access networks may include wireless access nodes such as base stations, base station routers, access points, and the like, which may be connected to a communication network by radio network controllers. The mobile nodes may include cellular telephones, personal data assistants, smart phones, text messaging devices, Global Positioning Systems, navigation systems, network interface cards, notebook computers, desktop computers, and the like. For another example, an access network that operates according to IEEE 802.3 standards may also be used to provide wired network connectivity to a mobile node that has a wired connection to an access node in the wired access network.

Numerous types of communication systems have been developed and deployed to provide network connectivity to mobile nodes. Exemplary communication systems include wire-line communication systems, such as Internets, intranets, systems that operate according to IEEE 802.3 standards, and the like. Wireless communication systems have also proliferated. Exemplary wireless communication systems include systems that provide wireless connectivity to micro cells (e.g., systems that provide wireless connectivity according to the IEEE 802.11 or IEEE 802.15 standards) and systems that provide wireless connectivity to macro cells (e.g., systems that operate according to the Third Generation Partnership Project standards—3GPP, 3GPP2—and/or systems operate according to the IEEE 802.16 and IEEE 802.20 standards).

The coverage provided by these heterogeneous communication systems may intersect and/or overlap. For example, a wireless access point for a wireless local area network may provide network connectivity to mobile nodes in a micro cell associated with a coffee shop that is within the macro cell coverage area associated with a base station of a cellular communication system. For another example, a wire-line connection may be available in an office building that also provides network connectivity via a wireless local area network. The office building may also be in a geographic area that receives cellular telephone coverage from one or more service providers.

At least partly in response to the proliferation of different communication systems, mobile nodes that support more than one type of access network have been developed. For example, a smart phone may support a wireless communication interface for accessing networks over an air interface and a wire-line communication interface for accessing networks when a physical connection to an access node is available. Mobile nodes that support multiple communication interfaces may hand off from one access node to another. Handoffs are typically triggered by one or more metrics such as signal quality, synchronization time differences, transmission error rates, and the like. For example, a moving mobile mode may encounter regions where the signal quality provided by one access node drops and may therefore handover to another access node having better signal quality. For another example, the signal quality provided to a stationary mobile node by a first access node may vary due to changing environmental conditions, triggering a handoff to a second access node.

Smooth handoffs between access nodes that operate according to different communication technologies, standards, and/or protocols may be difficult (or impossible) because of differences or incompatibilities between the different access nodes. The IEEE 802.21 standard has therefore been proposed to enhance the user's experience in mobile networks by supporting handovers between access nodes of heterogeneous networks. In particular, the IEEE 802.21 standard, which is also referred to in the art as the Media Independent Handover (MIH) standard, defines a specification that provides link layer intelligence and other related network information to upper layers to optimize handovers between heterogeneous media. This includes links specified by 3GPP, 3GPP2 and both wired and wireless media in the IEEE 802 family of specifications.

The MIH 802.21 protocol defines event services, command services, and information services. The Media Independent Information Service (MIIS) provides a framework and corresponding mechanisms by which a MIHF (Media Independent Handover Function) entity may discover and obtain network information existing within a geographical area to facilitate the handovers. Event services are used to transmit information regarding events from access nodes to mobile nodes and/or from mobile nodes to access nodes. Events may indicate changes in state and/or transmission behavior of the physical, data link and logical link layers, or predict state changes of these layers. The event service may also be used to indicate management actions or command status on part of a network or some such management entity. The event service is typically used to detect the need for handovers. Access nodes and/or mobile nodes may request that certain events be reported using an event registration or subscription message. However, transmission and acknowledgment of the event registration messages increases the overhead associated with implementing media independent handovers.

The command service enables higher layers and mobility management functions to control the physical, data link, and logical link layers (also known as "lower layers"). The higher layers may also control the reconfiguration or selection of an appropriate link through a set of handover commands. MIH capable access nodes or other core nodes do not, however, have a mechanism that may be used to determine which access node should provide command information to each mobile mode. Without such a mechanism, multiple such nodes may attempt to provide redundant or conflicting commands to the mobile nodes.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In embodiments of the present invention, methods are provided involving at least one mobile node and a heterogeneous network comprising a plurality of access nodes. One embodiment of the method includes providing at least one first message including information indicative of a selected access node. The access node is selected to provide command services to said at least one mobile node.

BRIEF DESCRIPTION OF THE DRAWINGS

The invention may be understood by reference to the following description taken in conjunction with the accompanying drawings, in which like reference numerals identify like elements, and in which.

Figure 1:
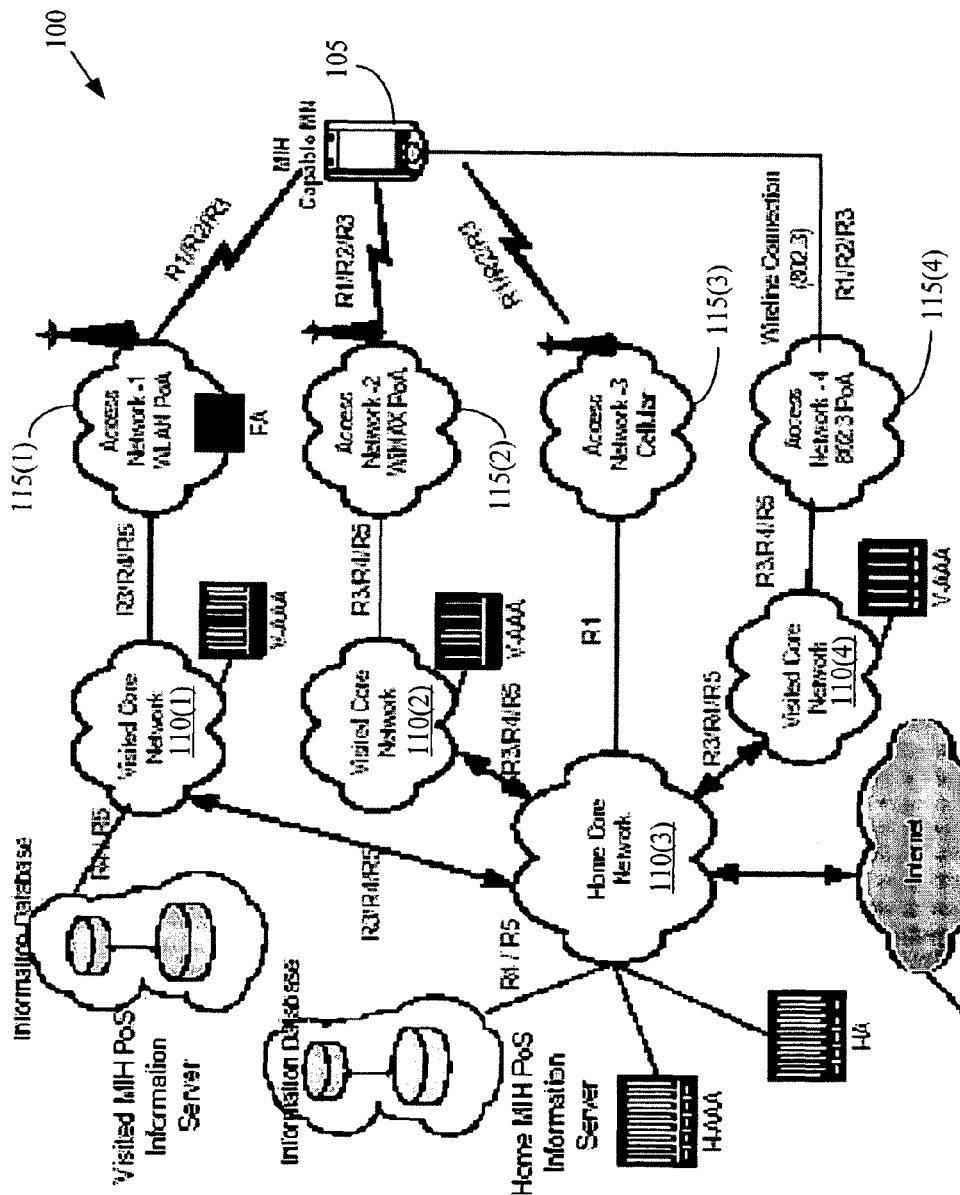
FIG. 1 conceptually illustrates a first exemplary embodiment of a heterogeneous communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be wireless, twisted wire pairs, CATS, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates a first exemplary embodiment of a heterogeneous network 100. As used herein and in accordance with usage in the art, the term "heterogeneous network" will be understood to refer to a network that includes interconnected portions, networks, and/or subnets that operate according to different standards and/or protocols. The heterogeneous network 100 may include portions that operate according to wired and/or wireless standards and/or protocols. For example, the heterogeneous network 100 may include wire-line communication systems, such as Internets, intranets, systems that operate according to IEEE 802.3 standards, and the like, as well as wireless communication systems that provide wireless connectivity according to the IEEE 802.11 or IEEE 802.15 standards, the Third Generation Partnership Project standards (3GPP, 3GPP2), the IEEE 802.16 standards, and the like.

The heterogeneous network 100 provides various communication services to one or more mobile nodes 105. Although a single mobile node 105 is shown in FIG. 1, persons of ordinary skill in the art having benefit of the present disclosure should appreciate that the heterogeneous network 100 may provide communication services to any number of mobile nodes 105. Persons of ordinary skill in the art having benefit of the present disclosure should also appreciate that the mobile node 105 may also be referred to using other terms such as "mobile unit," "mobile terminal," "access terminal," "subscriber terminal," "subscriber station," "mobile station," "user terminal", "terminal equipment" and the like. Exemplary mobile nodes 105 may include cellular telephones, personal data assistants, smart phones, text messaging devices, Global Positioning System devices, navigation systems, network interface cards, notebook computers, desktop computers, and the like.

The mobile node 105 supports multiple interfaces for one or more wire-line communication links and/or one or more wireless communication links, as will be discussed in detail below. In the illustrated embodiment, the mobile node 105 is multi-modal, i.e. the mobile node 105 is capable of supporting multiple radio standards and concurrently supporting connections on more than one radio interface. The mobile node 105 also may support media independent handoff (MIH) functionality. In one embodiment, the mobile node 105 supports the IEEE 802.21 standard, which is also referred to in the art as the Media Independent Handover (MIH) standard. The MIH standard defines a specification that provides link layer intelligence and other related network information to upper layers to optimize handovers between heterogeneous media.

The heterogeneous network 100 also includes various networks 110 that are interconnected to form the heterogeneous network 100. The indices (1-4) may be dropped when referring to the networks 110 collectively. However, the indices may be used to indicate individual networks 110 or subsets of the networks 110. The same convention may be applied to other elements in the drawings that are referred to by a number and one or more identifying indices. Each of the networks 110 includes at least one access network 115. The access networks 115 include one or more access nodes (not shown in FIG. 1) that may act as a Point of Attachment (or Point of Service) for the mobile node 105. The access nodes may be multi-modal, i.e. capable of supporting multiple radio standards and concurrently supporting connections on more than one radio interface.

In the illustrated embodiment, the heterogeneous network 100 includes a home core network 110(3) that acts as the home network for the mobile node 105. Accordingly, the mobile node 105 may access the home core network 110(3), as well as other networks connected to the home core network 110(3), by forming a communication link with an access node in a cellular access network 115(3). As shown in FIG. 1, the home core network 110(3) may be coupled to an information server that includes an information database, a home Authentication, Authorization, and Accounting (HAAA) server, and a Home Agent (HA). Techniques for configuration, operation, and/or maintenance of these elements are known in the art and in the interest of clarity only those aspects of the configuration, operation, and/or maintenance of these elements that are relevant to the present invention will be discussed further herein.

The heterogeneous network 100 also includes visited core networks 110(1, 2, 4) that may be communicatively coupled with the home core network 110(3). In the illustrated embodiment, the visited core networks 110(1, 2, 4) include a wireless local area network (WLAN) that may be accessed via an access node that acts as a Point of Attachment (PoA) in the access network 115(1), a WiMAX network that may be accessed via an access node that acts as a PoA in the access network 115(2), and a wire-line network that operates according to the IEEE 802.3 standards and may be accessed via an 802.3 access node PoA in the access network 115(4). However, any number or type of visited core networks 110(1, 2, 4) may be included in alternative embodiment of the heterogeneous network 100. As shown in FIG. 1, the visited core networks 110(1, 2, 4) may be coupled to an information server that includes an information database, a visited Authentication, Authorization, and Accounting (VAAA) server, and a Foreign Agent (FA). Techniques for configuration, operation, and/or maintenance of these elements are known in the art and in the interest of clarity only those aspects of the configuration, operation, and/or maintenance of these elements that are relevant to the present invention will be discussed further herein.

The mobile node 105 may form concurrent communication links with a plurality of access nodes in the access networks 115. For example, the mobile node 105 may be in make-before-break mode between two or more of the access networks 115. In the illustrated embodiment, the heterogeneous network 100 supports media independent handoff functionality such as the IEEE 802.21 MIH standard. The heterogeneous network 100, the access networks 115, and the mobile node 105 may therefore support various information services, event services, and command services that may be used to implement media independent handovers. Command services provided by multiple MIH capable nodes in an access or core network may be redundant, interfere with each other, conflict with each other, and/or conflict with one or more policies of the mobile node 105. The mobile node 105 may therefore select one node in the access network, herein called as the commanding access node or simply access node to be the controlling or commanding access node, e.g., by transmitting a message such as a registration request message to notify a selected access node that it is to be the commanding access node for the mobile unit 105, as will be discussed in detail below.

Figure 2:
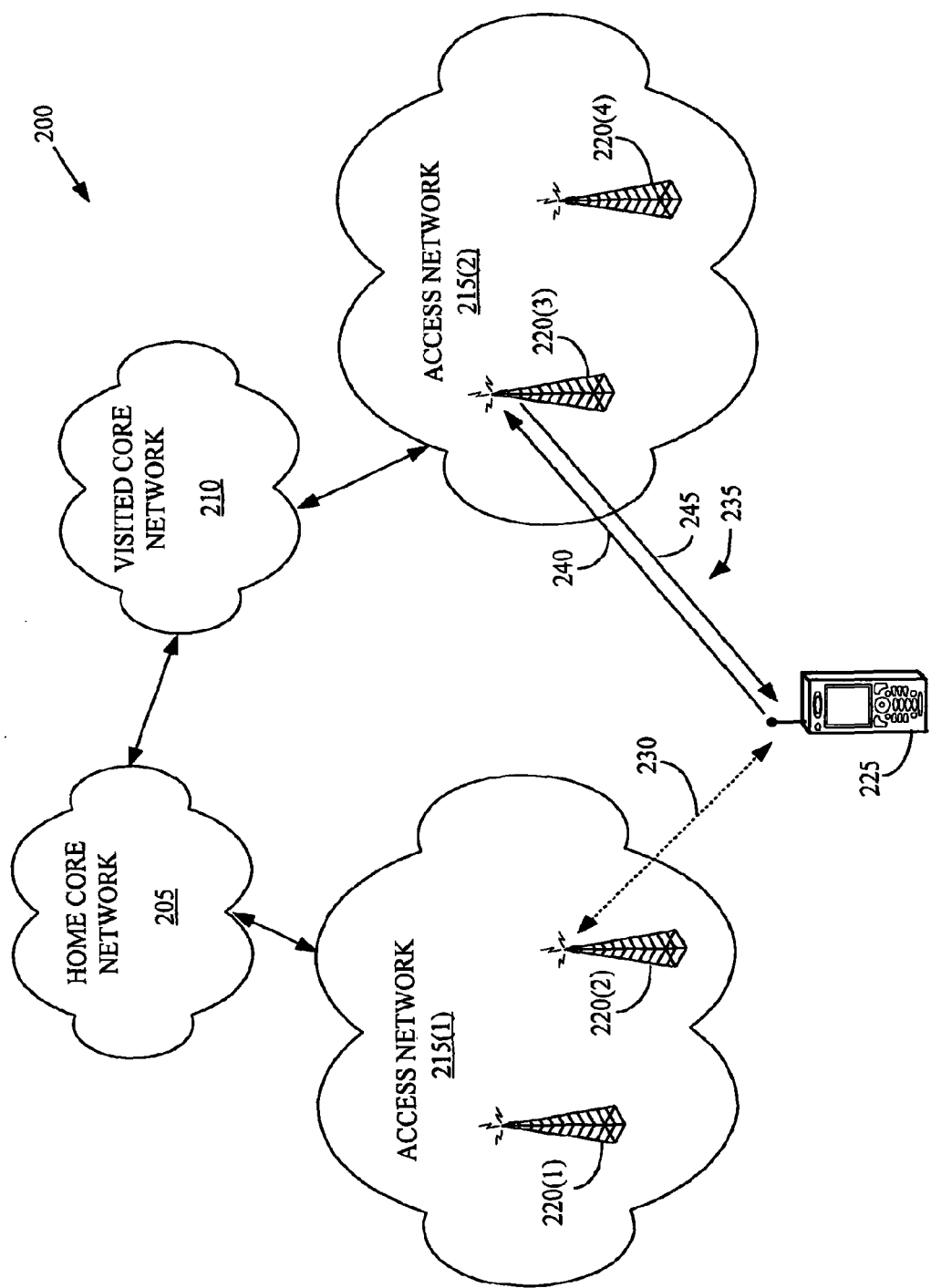
FIG. 2 conceptually illustrates a second exemplary embodiment of a heterogeneous network, in accordance with the present invention.

FIG. 2 conceptually illustrates a second exemplary embodiment of a heterogeneous network 200. In the illustrated embodiment, the heterogeneous network 200 includes a home core network 205 and a visited core network 210 that are communicatively coupled. Although a single visited core network 210 is shown in FIG. 2, persons of ordinary skill in the art having benefit of the present disclosure should appreciate that the heterogeneous network 200 may include any number of visited core networks 210. The home core network 205 and the visited core network 210 are communicatively coupled to corresponding access networks 215. Although the home core network 205 and the visited core network 210 shown in FIG. 2 are each coupled to one corresponding access network 215, persons of ordinary skill in the art having benefit of the present disclosure should appreciate that the home network 205 and/or the visited network 210 may be communicatively coupled using any type of wired or wireless connection between the core network 205 and any number of access networks 215 and may also be communicatively coupled to each other through a service level agreement.

Each of the access networks 215 includes one or more access nodes 220. The access nodes 220 may be any type of device used for providing access to the home core network 205 and/or the visited core network 210. Exemplary access nodes 220 include base stations, base station routers, access points, routers, hubs, and the like. The access nodes 220 may operate according to any standard or protocol including, but not limited to wire-line standards such as the IEEE 802.3 standards and wireless communication standards such as the IEEE 802.11 or IEEE 802.15 standards, the Third Generation Partnership Project standards (3GPP, 3GPP2), the IEEE 802.16 standards, and the like. However, persons of ordinary skill in the art having benefit of the present disclosure should appreciate that some or all of the access nodes 220 may not be included in the access networks 215. For example, one or more access nodes 220 may be included in the home core network 205 and/or the visited core network 210.

A mobile node 225 may form communication links with access nodes 220 in either (or both) of the access networks 215. In the illustrated embodiment, the mobile node 225 has (or had) a communication link 230 with the access node 220(2) in the access network 215(1). The mobile node 225 is also in the process of forming (or has already formed) a communication link 235 with the access node 220(3) in the access network 210(2). For example, the mobile node 225 may be in soft make-before-break handover mode from the access node 220(2) to the access node 220(3), in which case the communication links 230, 235 may be present concurrently. For another example, the mobile node 225 may be in hard handover (e.g., break-then-make) from the access node 220(2) to the access node 220(3), in which case the communication link 230 may be torn down before the communication link 235 is formed.

In the illustrated embodiment, the mobile node 225 selects the access node 220(3) to be the controlling or command node, i.e., the node that provides command services. The mobile node 225 provides a registration message (as indicated by the arrow 240) that informs the access node 220(3) that it is to act as the controlling node for the mobile node 225. For example, the registration message may include information that informs the access node 220(3) of any pertinent policies, such as handover policies, which have been downloaded or pre-provisioned to the mobile node 225 by a service provider. In one embodiment, the registration message (or another message sent with the registration message) may also include information indicating the request for event services (and/or associated event thresholds) that are associated with the mobile node 225, as will be discussed in detail below. The access node 220(3) may return a confirmation or acknowledgment message (as indicated by the arrow 245) in response to the registration message provided by the mobile node 225. In one embodiment, the acknowledgment message provided by the access node 220(3) may also include information indicating request for event services associated with the mobile node 225.

Figure 3:
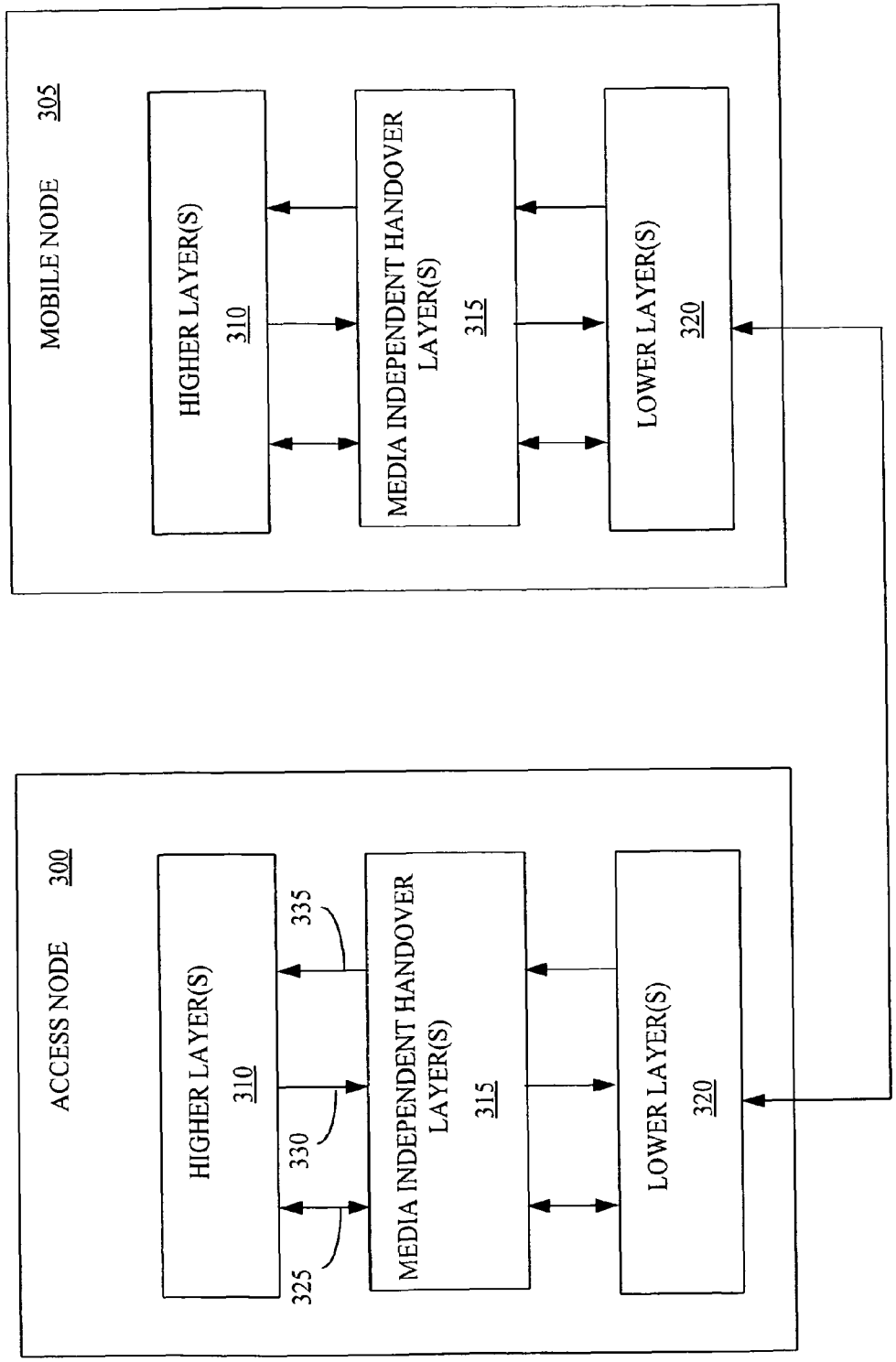
FIG. 3 conceptually illustrates one exemplary embodiment of an access node and the mobile node, in accordance with the present invention.

FIG. 3 conceptually illustrates one exemplary embodiment of an access node 300 and the mobile node 305. In the illustrated embodiment, the access node 300 and the mobile node 305 support media independent handovers. For example, the access node 300 and the mobile node 305 may be configured to support the IEEE 802.21 Media Independent Handover standards. Accordingly, the various layers implemented in the access node 300 and/or the mobile node 305 may be divided into higher layers 310, media independent handover layers 315, and lower layers 320. The layers 310, 315, 320 may be implemented in any combination of hardware, firmware, and/or software.

As used herein and in accordance with usage in the art, the term "media independent handover layer" will be understood to refer to a generic link layer that implements intelligence that is independent of the specifics of mobile nodes or radio networks. The media independent handover layer 315 therefore provides a generic interface between the higher layer and/or MIH users in the mobility-management protocol stack and existing media-specific link layers, such as those specified by 3GPP, 3GPP2 and the IEEE 802 family of standards. The media independent handover layer 315 may provide services to the upper layers 310 through a single technology-independent interface (e.g., an MIH Service Access Point or SAP) and may obtain services from the lower layers 320 through a variety of technology-dependent interfaces (media-specific SAPs).

As used herein and in accordance with usage in the art, the term "higher layer" will be understood to refer to a layer or layers 310 that make use of the services provided by the media independent handoff (MIH) functionality layers 315 and hence may be referred to as MIH users. Examples of higher layers 310 are the layers or functions that implement connectivity such as the Internet Protocol (IP), Mobile IP mobility management, Session Initiation Protocol (SIP), the Transmission Control Protocol (TCP), the User Datagram Protocol (UDP), application layers, and the like.

As used herein and in accordance with usage in the art, the term "lower layers" will be understood to refer to layers located at OSI Level 2 and below across different media specific technology standards supported by the IEEE 802.21 specification. As an example, lower layers 320 defined in the IEEE 802.11 specification are the Media Access Control (MAC) layer and the physical (PHY) layer. For another example, the lower layers 320 defined by the 3GPP standards are the MAC and PHY layers. The lower layers 320 may also include logical link control layers such as 802.2 LLC or 3GPP RLC. The MIH functionality may use the services provided by these layers.

The media independent handover layers 315 may provide various services that may be utilized by the higher layers 310 and/or the lower layers 320. Exemplary services include information services (indicated by the arrow 325), command services (indicated by the arrow 330), and event services (indicated by the arrow 335). In the interest of clarity, only one set of the arrows 325, 330, 335 have been indicated by numerals in FIG. 3. In one embodiment, the media independent handover layers 315 provide asynchronous and/or synchronous services through well defined SAPs for link layers 320 and MIH users 310. In the case of a system with multiple network interfaces of arbitrary type, the upper layers 310 may use the event service, command service and information service provided by MIH to manage, determine, and control the state of the underlying interfaces. The information services, command services, and event services are defined in more detail below.

As used herein and in accordance with usage in the art, the term "information service" will be understood to refer to operations and/or algorithms (as well as the messages, protocols, and/or code used to implement these operations and algorithms) that provides a framework and corresponding mechanisms by which a Media Independent Handover Function (MIHF) entity may discover and obtain network information existing within a geographical area to facilitate initial connectivity or the handovers. Information services may provide a set of information elements (IEs), the information structure and its representation, and a query/response type of mechanism for information transfer. This contrasts with the asynchronous push model of information transfer for the event service. The information may be present in an information server (not shown) and the MIH Function 315 may access the information from the information server. The information may be made available via both lower layers 320 and higher layers 310.

As used herein and in accordance with usage in the art, the term "event service" will be understood to refer to operations and/or algorithms (as well as the messages, protocols, and/or code used to implement these operations and algorithms) that enable identification of events and the transmission of information associated with or indicative of the events. Events may indicate changes in state and transmission behavior of the physical, data link and logical link layers, or predict state changes of these layers. The Event Service may also be used to indicate management actions or command status on part of network or some such management entity. Events may originate from the MIH Function (MIH Events) or any lower layer (Link Events). The destination of an event may be the MIH Function, any upper layer entity, or any MIH user. The recipient of the event may be located within the stack that originated the event or within a remote stack. In case of local events, messages typically propagate from the lower layers 320 (PHY, MAC, GMM . . . ) to the MIH Function 315 and from MIH Function 315 to any upper layer 310. In case of remote events, messages propagate from the MIH Function 315 in one stack to the MIH Function 315 in the peer stack. Events may then be further propagated to any upper layer 310.

As used herein and in accordance with usage in the art, the term "command service" will be understood to refer to operations and/or algorithms (as well as the messages, protocols, and/or code used to implement these operations and algorithms) that enable mobility management or higher layers 310 to control the physical, data link, and logical link layers (collectively known as lower layers 320). The higher layers 310 may also control the reconfiguration or selection of an appropriate link through a set of handover commands that may be considered part of the command services. Commands may be invoked from mobility management function or upper layers 310 (MIH Commands) as well as from the MIH Function 315 (Link Commands). The destination of a command may be the MIH Function 315 or any lower layer 320. The recipient of a command may be located within the stack that originated the command, or within a remote stack. In case of local commands, messages typically propagate from the upper layers 310 (e.g., from a policy engine implemented in the upper layers 310) to the MIH Function 315 and then from MIH Function 315 to lower layers 320. In case of remote commands, messages may propagate from upper layers 310 via MIH Function 315 in one stack to the MIH Function 315 in a peer stack (with the use of the MIH Protocol). Commands may then be further propagated to any lower layer 320.

The mobile node 305 may provide messages to the access node 300 to inform the access node 300 that it is the controlling node for command services provided to the mobile node 305. In one embodiment, the mobile node 305 provides a registration request message to the access node 300 over an uplink. The registration request message may be an MIH level message that includes information that may be used to create an MIH pairing between the mobile node 305 and the controlling access node 300. In one embodiment, the registration request message is sent from the MIH layer 315 in the mobile node 305 to the MIH layer 315 in the access node 310. Upon receipt of the registration request message, the access node 300 may set up a command service session using information included in the registration request message so that the access node 300 becomes the controlling access node for the mobile node 305.

The registration request message (or other messages transmitted with the registration request message) may include additional information that may be used by the access node 300. In one embodiment, the registration request message may include information indicative of handover policies associate with the mobile node 305. As used herein and in accordance with usage in the art, the term "handover policy" will be understood to refer to a set of rules that contribute to shaping handover decisions for a mobile node 305. The handover policy may be provisioned to the mobile node 305 by the network or access provider. In another embodiment, the registration request message may include information indicative of an event registration associated with the mobile node 305. For example, the registration request message may include information indicating the events that should be reported, as well as thresholds for triggering reporting of the events.

Figure 4:
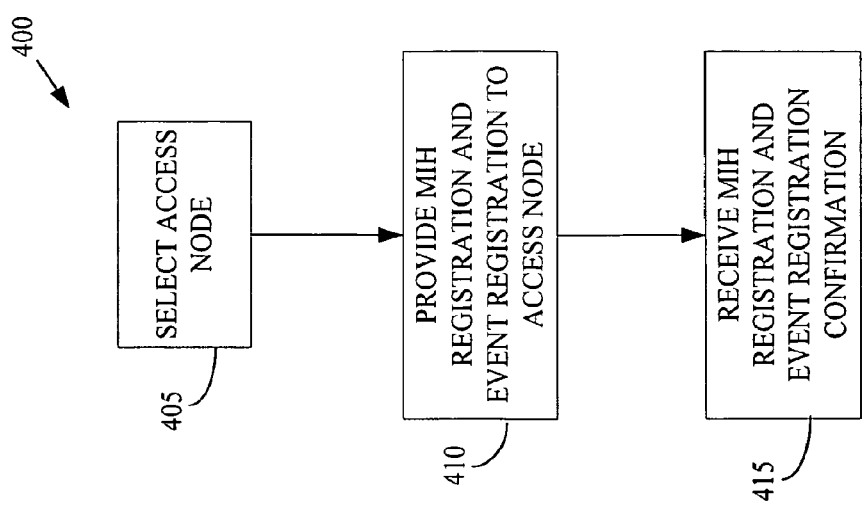
FIG. 4 conceptually illustrates a first exemplary embodiment of a method of media independent handover registration, in accordance with the present invention.

FIG. 4 conceptually illustrates a first exemplary embodiment of a method 400 of media independent handover registration. In the illustrated embodiment, a mobile node may select (at 405) an access node to be the controlling node for providing command services to the mobile node. The mobile node may then provide (at 410) a registration request message to the selected access node. In one embodiment, the mobile node may also provide (at 410) event registration information in the registration request message, or a separate event registration message that piggy-backs with the registration request message, to the selected access node. The access node may then provide an acknowledgment or confirmation of the received registration request message and, if provided, the event registration message, which may be received (at 415) by the mobile node. The first exemplary embodiment of the method 400 may therefore be a 3-way handshake process that establishes the access node as the controlling node for the mobile unit.

Figure 5:
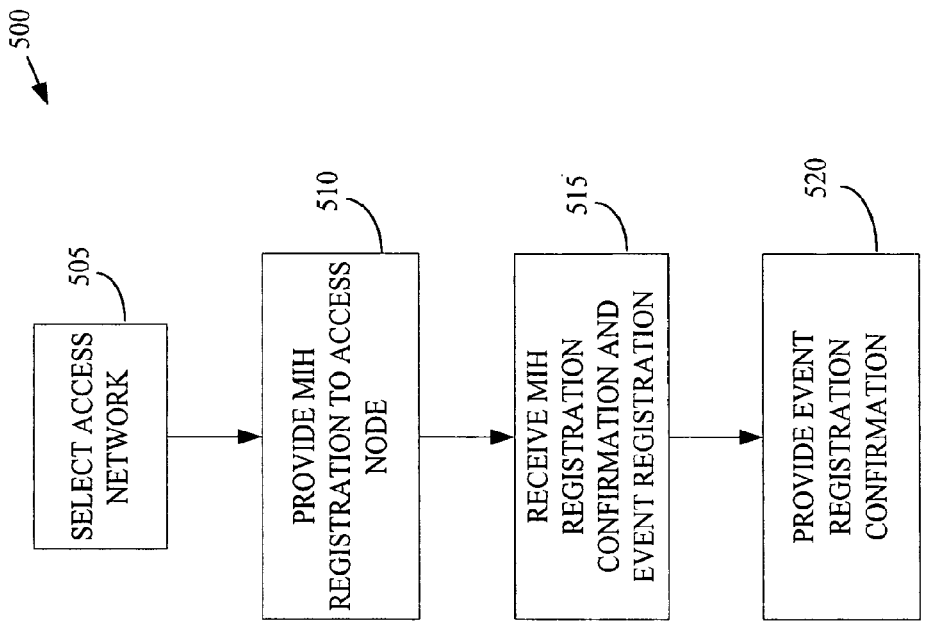
FIG. 5 conceptually illustrates a second exemplary embodiment of a method of media independent handover registration, in accordance with the present invention.

FIG. 5 conceptually illustrates a second exemplary embodiment of a method 500 of media independent handover registration. In the illustrated embodiment, a mobile node may select (at 505) an access node to be the controlling node for providing command services to the mobile node. The mobile node may then provide (at 510) a registration request message to the selected access node. The access node may then provide an acknowledgment or confirmation of the received registration request message, which may be received (at 515) by the mobile node. In one embodiment, the access node may also provide event registration information in the registration request acknowledgement message, or a separate event registration message that piggy-backs with the registration request acknowledgement message, to the mobile node. The mobile node may then provide (at 520) an acknowledgment or confirmation that the event registration was received.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A mobile node, comprising:
    at least one of a physical layer, a data link layer, and a logical link layer; and
    at least one of a mobility management layer and one or more higher layers, wherein the mobile node is configured to provide, to a node in an access network prior to a subsequent handover of the mobile node, a request to have the node provide media independent handover (MIH) command services to the mobile node to control reconfiguration or selection of an appropriate link for the subsequent handover through a set of handover commands, wherein the MIH command services enable at least one of the mobility management layer and the one or more higher layers to control at least one of the physical layer, the data link layer, and the logical link layer during the subsequent handover of the mobile node.

2. The mobile node of claim 1, further comprising:
    an MIH layer implemented between the mobility management layer and the physical layer, data link layer, and logical link layers in the mobile node, and wherein providing the request comprises providing a request generated at the MIH layer.

3. The mobile node of claim 2, wherein the mobile node is configured to provide information indicative of at least one threshold for reporting at least one event associated with a heterogeneous network.

4. The mobile node of claim 1, wherein the mobile node is configured to provide at least one handover policy that has been provisioned to the mobile node by a service provider, and wherein the mobile node is configured to form a media independent pairing between the mobile node and the node in the access network in response to providing the request.

5. The mobile node of claim 1, wherein the node is a point of attachment or point of service for the mobile node in the access network.

6. The mobile node of claim 5, wherein the mobile node is configured to select the node in the access network based on at least one policy associated with the mobile node.

7. The mobile node of claim 6, wherein the mobile node is configured to provide information indicative of said at least one policy generated by a policy engine.

8. The mobile node of claim 1, wherein the mobile node is configured to receive, from the node in the access network, at least one response to the request, said at least one response indicating that the node in the access network confirms registration of the mobile node.

9. The mobile node of claim 8, wherein the mobile node is configured to receive a request to report at least one event associated with the mobile node to the node in the access network.

10. The mobile node of claim 9, wherein the mobile node is configured to provide, to the node in the access network, at least one further response including information indicative of at least one event associated with the mobile node.

11. A node for implementation in an access network, comprising:
    at least one of a physical layer, a data link layer, and a logical link layer; and
    at least one of a mobility management layer and one or more higher layers, wherein the node is configured to receive, from a mobile node prior to a subsequent handover of the mobile node, a request for the node to provide media independent handover (MIH) command services to the mobile node, wherein the MIH command services enable at least one of the mobility management layer and the one or more higher layers to control at least one of physical, data link, and logical link layers during the subsequent handover of the mobile node, and wherein receiving the request comprises receiving information indicating that the mobile node has selected the node in the access network to provide the MIH command services to control reconfiguration or selection of an appropriate link for the subsequent handover through a set of handover commands.

12. The node of claim 11, further comprising:
    an MIH layer implemented between the mobility management layer and the physical layer, data link layer, and logical link layers in the mobile node, and wherein the node is configured to receive the request at the MIH layer in the node in the access network, and wherein the request is generated at an MIH layer implemented in the mobile node, and wherein the node is configured to form a media independent pairing between the mobile node and the node in the access network in response to receiving the request.

13. The node of claim 11, wherein the node is a point of attachment or a point of service for the mobile node in the access networks.

14. The node of claim 13, wherein the node is configured to receive information indicative of at least one policy generated by a policy engine that can be used to select the node in the access network.

15. The node of claim 12, wherein the node is configured to receive information requesting reporting at least one event associated with a heterogeneous network to the mobile node.

16. The node of claim 15, wherein the node is configured to receive information indicative of at least one threshold for reporting said at least one event associated with the heterogeneous network.

17. The node of claim 11, wherein the node is configured to provide, to the mobile node, a response to receiving at least one first message indicating that the node in the access network confirms registration of the mobile node.

18. The node of claim 17, wherein the node is configured to provide a request to report at least one event associated with the mobile node.

19. The node of claim 18, wherein the node is configured to provide, to the mobile node, information indicative of at least one threshold for reporting said at least one event associated with the mobile node.

20. The node of claim 18, wherein the node is configured to receive, from the mobile node, information indicative of at least one event associated with the mobile node.

21. A mobile node, comprising:
    at least one of a physical layer, a data link layer, and a logical link layer; and
    at least one of a mobility management layer and one or more higher layers, wherein the mobile node is configured to provide, to a node in an access network, a request to have the node provide media independent handover (MIH) command services to the mobile node, wherein the MIH command services enable at least one of the mobility management layer and the one or more higher layers to control at least of one of the physical layer, the data link layer, and the logical link layer, and wherein the MIH command services enable at least one of the mobility management layer or the higher layers to control reconfiguration or selection of an appropriate link for a handover of the mobile node through a set of handover commands.

* * * * *